United States Patent
David et al.

(10) Patent No.: US 7,720,173 B2
(45) Date of Patent: May 18, 2010

(54) APPARATUS AND METHOD FOR TRANSMITTING/RECEIVING DATA IN MULTI-USER MULTI-ANTENNA COMMUNICATION SYSTEM

(75) Inventors: Mazzarese David, Suwon-si (KR); Chan-Byoung Chae, Seoul (KR)

(73) Assignee: Samsung Electronics Co., Ltd (KR)

( * ) Notice: Subject to any disclaimer, the term of this patent is extended or adjusted under 35 U.S.C. 154(b) by 769 days.

(21) Appl. No.: 11/581,841

(22) Filed: Oct. 17, 2006

(65) Prior Publication Data
US 2007/0086543 A1    Apr. 19, 2007

(30) Foreign Application Priority Data
Oct. 17, 2005    (KR)    .................. 10-2005-0097718

(51) Int. Cl.
*H04L 27/04* (2006.01)
(52) U.S. Cl. .................. 375/295; 375/267; 375/148; 375/147; 375/259; 375/299; 370/210; 370/334; 370/216; 370/465; 455/454; 455/450; 455/500
(58) Field of Classification Search .................. 375/267, 375/259, 148, 260, 295, 147, 59, 299; 455/454, 455/450, 500; 370/210, 334, 216, 465
See application file for complete search history.

(56) References Cited

U.S. PATENT DOCUMENTS

| | | | | |
|---|---|---|---|---|
| 2003/0125040 A1* | 7/2003 | Walton et al. | ................ | 455/454 |
| 2004/0146025 A1* | 7/2004 | Hwang et al. | ................ | 370/334 |
| 2004/0178954 A1 | 9/2004 | Vook et al. | | |
| 2004/0192218 A1* | 9/2004 | Oprea | ......................... | 455/73 |
| 2005/0149596 A1* | 7/2005 | Jeon et al. | ................... | 708/607 |
| 2005/0157806 A1 | 7/2005 | Walton et al. | | |
| 2005/0254437 A1 | 11/2005 | Erven | | |
| 2006/0013250 A1* | 1/2006 | Howard et al. | .............. | 370/465 |
| 2006/0209975 A1* | 9/2006 | Jeong et al. | ................. | 375/260 |
| 2007/0086540 A1* | 4/2007 | Chae et al. | ................. | 375/267 |

FOREIGN PATENT DOCUMENTS

| | | |
|---|---|---|
| KR | 1020040005530 | 1/2004 |
| KR | 1020040012582 | 2/2004 |

(Continued)

OTHER PUBLICATIONS

Max H.M. Costa; "Writing on Dirty Paper"; IEEE Transactions on Information Theory; vol. 29; No. 3; May 1983; pp. 439-441.

(Continued)

*Primary Examiner*—Chieh M Fan
*Assistant Examiner*—Eva Y Puente
(74) *Attorney, Agent, or Firm*—The Farrell Law Firm, LLP

(57) ABSTRACT

An apparatus and method for transmitting/receiving data in a multi-user multi-antenna communication system is provided. A data transmitting apparatus and method computes a TX filter of a transmitter in an improved scheme and transmits the computed TX filter to a receiver in a one-way channel sounding scheme. A data receiving apparatus and method receives the TX filter over a channel and uses the product of the received TX filter and a channel matrix as an RX filter.

24 Claims, 8 Drawing Sheets

FOREIGN PATENT DOCUMENTS

| | | |
|---|---|---|
| KR | 1020060066768 | 6/2006 |
| KR | 1020070017714 | 2/2007 |
| WO | WO 03/005605 | 1/2003 |
| WO | WO 2004/112279 | 12/2004 |
| WO | WO 2005/099125 | 10/2005 |

OTHER PUBLICATIONS

Choi, Lai-U et al.; "A Transmit Preprocessing Technique for Multiuser MIMO Systems Using a Decomposition Approach"; IEEE Transactions on Wireless Communications; vol. 3; No. 1; Jan. 2004; pp. 20-24.

Behrouz Farhang-Boroujeny et al.; "Layering Techniques for Space-Time Communication in Multi-User Networks"; IEEE Vehicular Technology Conference (VTC' 03 Fall); Orlando Fla.; Oct. 2003; pp. 1339-1343.

* cited by examiner

APPARATUS AND METHOD FOR TRANSMITTING/RECEIVING DATA IN MULTI-USER MULTI-ANTENNA COMMUNICATION SYSTEM

PRIORITY

This application claims priority under 35 U.S.C. §119 to a Korean application filed in the Korean Intellectual Property Office on Oct. 17, 2005 and allocated Serial No. 2005-97718, the contents of which are incorporated herein by reference.

BACKGROUND OF THE INVENTION

1. Field of the Invention

The present invention relates generally to an apparatus and method for transmitting/receiving data in a multi-user multi-antenna communication system. In particular, the present invention relates to a data transmitting apparatus and method for computing a transmit (TX) filter of a transmitter in an improved scheme and transmitting the computed TX filter to a receiver in a one-way channel sounding scheme; and a data receiving apparatus and method for receiving the TX filter over a channel and using the product of the received TX filter and a channel matrix as a receive (RX) filter.

2. Description of the Related Art

Research has been conducted on Multiple Input Multiple Output (MIMO) channels over ten years. In addition, researches are being conducted on a multi-user multi-antenna communication system. The use of multi-antenna in a transmitter increases spectral efficiency and also the use of a multi-antenna in a receiver further increases spectral efficiency. Research on the multi-user multi-antenna communication system is intended to apply the above fact to a multi-user communication system.

A MIMO communication system establishes a multi-link between a transmitter and a single user, thereby increasing spectral efficiency. In the MIMO communication system, only one user can access a given resource among channel resources (e.g., subcarriers, spreading codes, and cell sectors) at a time. That is, a MIMO link (i.e., independent data streams) exists between a transmitter and only one receiver at a given time. On the other hand, the multi-user multi-antenna communication system allows a plurality of users (terminals) to access the same resource simultaneously, and independent data streams occur between a transmitter and a plurality of user receivers. The multiplexing scheme used for this is called "multi-user Spatial Multiplexing (SM)".

FIG. 1 is a schematic block diagram of a multi-user multi-antenna communication system where communications are performed between a transmitter having a plurality of TX antennas and a plurality of receivers each having a plurality of RX antennas.

Referring to FIG. 1, a base station (BS) transmitter 110 having N number of TX antennas (simply referred to as "N TX antennas") communicates with K user receivers 120, 130 and 140 each having a plurality of RX antennas. The transmitter 110 transmits independent data streams to the receivers 120, 130 and 140 by using a multi-user SM scheme.

A MIMO broadcast channel, an example of a multi-user multi-antenna communication channel, is a downlink (DL) channel of a cellular network where a base station (transmitter) uses multiple TX antenna.

An example of a theoretical scheme for a MIMO broadcast channel in a cellular system is disclosed in M. Costa, "Writing On Dirty Paper", IEEE Transactions on Information Theory, Vol. 29, No. 3; pp. 439-441, May 1983. This theoretical scheme is, however, unrealistic because it is based on the assumption that a transmitter and every user receiver accurately know the channels of all user receivers. In addition, the above theoretical scheme is highly complex because it uses non-linear precoding techniques.

FIG. 2 is a block diagram of a multi-user multi-antenna communication system where a transmitter uses a plurality of TX antennas and a TX filter and a plurality of receivers each using a plurality of RX antennas and an RX filter. For actual communication, a transmitter uses a TX filter and each receiver uses an RX filter.

Referring to FIG. 2, the transmitter includes SM TX filters 210, 220 and 230 that incorporate TX filters $M_l, M_k, \ldots, M_n$, respectively. Likewise, the receivers respectively include SM RX filters 240, 250 and 260 that incorporate RX filters $W_l, W_k, \ldots, W_n$, respectively.

A multi-user SM scheme, disclosed in Lai-U Choi and Ross D. Murch, "A Transmit Preprocessing Technique for Multiuser MIMO Systems Using a Decomposition Approach", IEEE Transactions on Wireless Communications, Vol. 2, No. 4, pp. 773-786, July 2003, is based on the assumption that some entity (terminal) knows channel matrixes of all users (terminals) and can compute TX/RX filters for optimization of communication performance.

The disclosed multi-user SM scheme is, however, silent on which entity can compute the TX/RX filters, and on how the computed TX/RX filter information (knowledge) can be transmitted from a transmitter to receivers. If information (knowledge) about all the respective channel matrixes between the transmitter and the receivers is available to the receiver, it is called "global channel information (knowledge)". This is, however, also impossible in an actual system.

FIG. 3 is a graph illustrating spectral efficiencies depending on the type of algorithm used in a multi-user multi-antenna communication system. In FIG. 3, local Channel State Information (CSI) refers to a realistic case where each receiver knows only its own channel matrix. Global CSI refers to an unrealistic case where each receiver knows channel matrixes of all receivers. Partial CSI refers to a case where a transmitter uses some measure of channel. quality, which indicates CSI such as signal-to-noise ratio (SNR). Complete CSI refers to a case where a transmitter uses the complex entry of CSI in itself.

As can be seen from FIG. 3, the frequency efficiency in the case of transmission to a single user (single-user closed loop, local CSI, complete CSI), as illustrated mark +, is lower by 4.6 bits/sec/Hz than that in the case of sum-capacity (nonlinear precoding scheme; global CSI, complete CSI), as illustrated mark ∇, which is the theoretical maximum data rate of a multi-user communication having four TX antennas, four users, and four RX antennas. Although not illustrated in FIG. 3, the frequency efficiency decreases when multiplex transmission is performed on user receivers but a transmitter and a receiver use partial CSI and local CSI, respectively.

The spatial efficiency in the case of a coordinated beamforming algorithm, as illustrated mark o, is lower by 0.7 bits/sec/Hz than that in the case of the sum-capacity. The use of the coordinated beamforming algorithm makes it possible to design an effective method of transmitting information about RX filters to user receivers by transmitting only one layer to each user receiver, as disclosed in B. Farhang-Boroujeny, Q. Spencer and L. Swindlehurst, "Layering Techniques for Space-Time Communication in Multi-User Networks," in Proceedings of IEEE Vehicular Technology Conference (VTC'03 Fall), Orlando, Fla., Oct., 6-9, 2003, Vol. 2, pp. 1339-1343.

The coordinated beamforming algorithm is now described in detail.

First, an algorithm for computing TX/RX filters follows:
Computation Phase $A_i$ represents the $i^{th}$ column of any matrix A. When the matrix A is Singular Value Decomposition (SVD)-processed, A=UDV*. Here, U and V are unitary matrixes and D is a singular value of the matrix A with diagonal elements arranged in descending order. The principal left singular vector of the matrix A is denoted as $U_I$ that is the first column of the matrix U.

The following computation is performed on the assumption that a base station has a complete CSI.

---

Initialization
for k = 1:K
    $H_k$ = UDV    SVD
    $W_k = U_1$
end
Repeat times:
    Effective channel vector computation
    for k = 1:K
        $H_{eff,k} = W_k^* H_k$
    end
    Update of TX/RX filters
    for k = 1:K
        $H_{stacked,k} = [H_{eff,1}^T \ldots H_{eff,k-1}^T H_{eff,k+1}^T \ldots H_{eff,K}^T]^T$
        $H_{stacked,k} = U_k D_k V_k$    SVD
        $M_k = V_{k,N}$ $$W_k = \frac{H_k V_{k,N}}{\|H_k V_{k,N}\|}$$

end
End of iterations

--- where SVD represents singular value decomposition, D is a diagonal matrix, and U and V are unitary matrixes. $H_{eff,k}$ represents an effective channel matrix of a user receiver k that the receiver actually experiences, and $H_{stacked,k}$ represents effective channels of receivers of all users other than the user receiver k. $M_k$ is a TX filter matrix for the user receiver k, $W_k$ is an RX filter matrix for the user receiver k, and $V_{k,n}$ is a singular vector in the num space of $H_{stacked,k}$. T represents a transpose, and * represents a complex conjugate transpose.

As the algorithm is iterated to convergence, a transmitter performs zero-forcing beamforming (ZFBF) on each user receiver based on an effective channel matrix containing an RX filter.

Although not indicated in the above algorithm, SVD is again used to calculate $W_k$ from $M_k$. As a result, the above algorithm performs SVD on each user receiver twice during the computation of the TX/RX filters and performs SVD once during the initialization, which causes a complexity problem. Moreover, the base station knows the optimal TX/RX filters for each of N user receivers but the user receivers do not. However, the above algorithm is silent on a technique for informing the receivers of the optimal RX filters. What is therefore required are: (a) a scheme for informing the receivers of the optimal RX filters;

(b) a data transmitting apparatus and method for a multi-antenna communication system that can provide a simpler scheme for computing a TX filter and an improved scheme for enabling a receiver to easily compute an RX filter; and (c) a data receiving apparatus and method for a multi-antenna communication system that can efficiently receive a TX filter computed by a transmitter. Finally, what is required is a data transmitting/receiving apparatus and method for a multi-user multi-antenna communication system that can reduce the system complexity, increase the spectral efficiency and be implemented even when a receiver does not know the channels of other receivers.

SUMMARY OF THE INVENTION

An object of the present invention is to substantially solve at least the above problems and/or disadvantages and to provide at least the advantages below. Accordingly, an object of the present invention is to provide a data transmitting apparatus and method for a multi-antenna communication system that can efficiently compute a TX filter.

Another object of the present invention is to provide a data transmitting apparatus and method for a multi-antenna communication system that can efficiently transmit the computed TX filter to a receiver.

A further object of the present invention is to provide a data receiving apparatus and method for a multi-antenna communication system that receives the computed TX filter from the transmitter and computes an RX filter using the received TX filter.

According to one aspect of the present invention, there is provided a transmitter for a multi-user multi-antenna communication system, including a Spatial Multiplexing (SM) TX filter unit for computing TX filters for a plurality of user receivers; and a plurality of antennas for transmitting the computed TX filters to the corresponding user receivers.

According to another aspect of the present invention, there is provided a receiver for a multi-user multi-antenna communication system, including one or more antennas for receiving a TX filter from a transmitter; and an SM RX filter unit for normalizing the product of the received TX filter and a channel matrix to obtain an RX filter.

According to a further aspect of the present invention, there is provided a method for transmitting data from a transmitter in a multi-user multi-antenna communication system, the method including computing TX filters for a plurality of user receivers; and transmitting the computed TX filters through a plurality of antennas to the corresponding user receivers in a one-way channel sounding scheme.

According to still another aspect of the present invention, there is provided a method for receiving data at a receiver in a multi-user multi-antenna communication system, the method including receiving a TX filter from a transmitter through one or more antennas; normalizing the product of the received TX filter and a channel matrix to obtain an RX filter; and decoding the received data using the obtained RX filter.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a data transmitting apparatus and method for a multi-user multi-antenna communication system that computes a TX filter efficiently and transmits the computed TX filter to a receiver in a one-way channel sounding scheme; and a data receiving apparatus and method for a multi-user multi-antenna communication system that receives the TX filter over a channel and uses the product of the received TX filter and a channel matrix as an RX filter.

The present invention is premised on a communication system where a transmitter knows DL CSI on a receiver. In the following description, a Time Division Duplexing (TDD) multi-user multi-antenna communication system where a BS transmitter can obtain Down Link (DL) Channel State Information (CSI) by estimation of an uplink (UL) channel is taken as an example.

Figure 1:
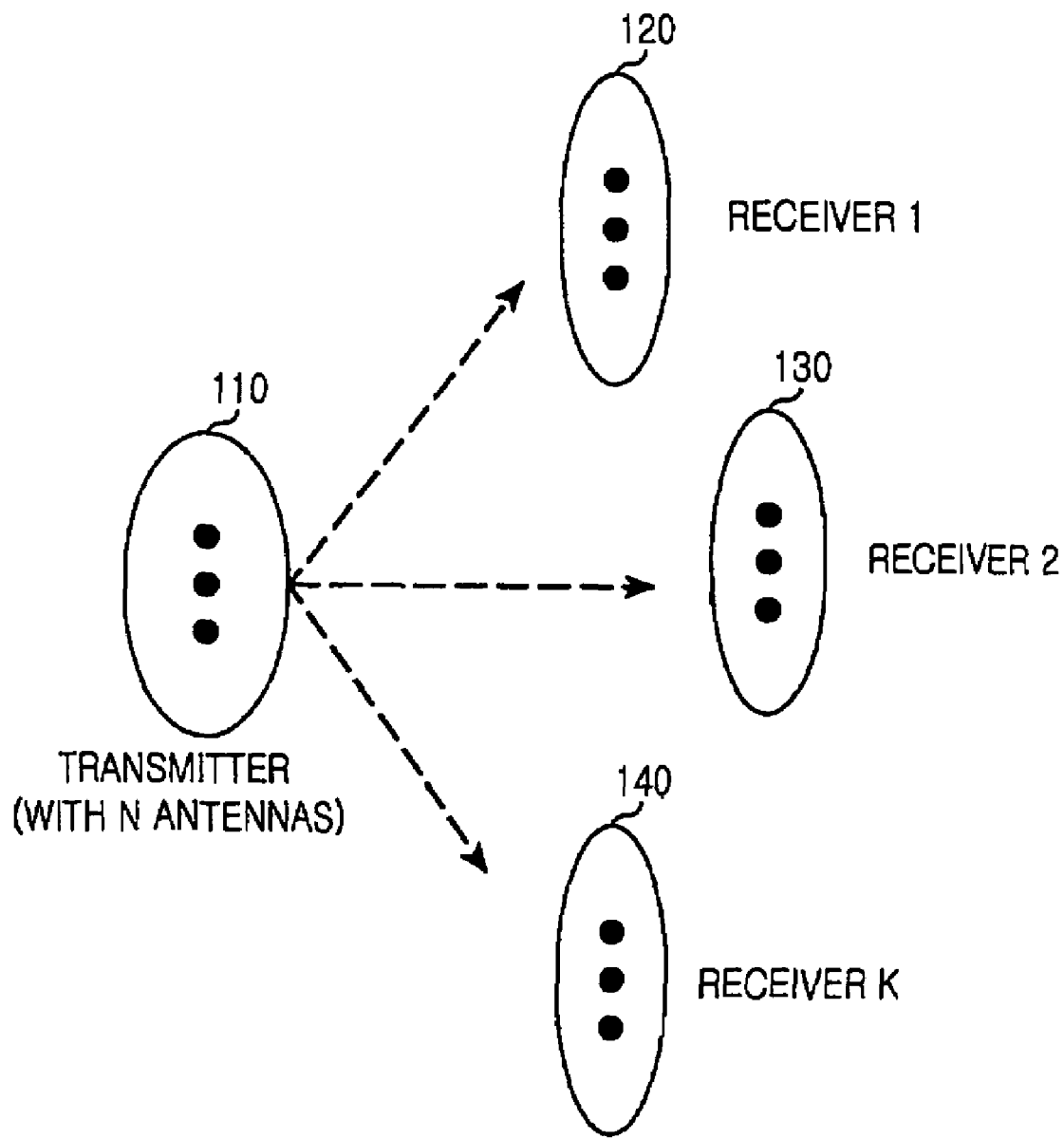
FIG. 1 is a schematic block diagram of a typical multi-user multi-antenna communication system where communications are performed between a transmitter having a plurality of TX antennas and a plurality of receivers each having a plurality of RX antennas.

The present invention considers a multi-user multi-antenna communication system where a BS transmitter has N TX antennas and a user receiver k among a plurality of user receivers has $N_k$ RX antennas, as illustrated in FIG. 1. A channel between the transmitter and the user receiver k is represented by a matrix $H_k$. When a channel changes slower than DL/UL frames, it can be said that the channel is constant for several frames and is the same throughout a downlink and an uplink. In this case, a BS and user receivers estimates the same channel. The BS can estimate all channel matrixes $H_k$ (k=1, . . . , k,) between the BS transmitter and the user receivers using a data transmission or uplink sounding pilots transmitted by the user receivers. In other embodiment the user receiver k can estimate a matrix $H_k$ and the user receiver k reports the estimated $H_k$ to the BS. The transmitter and the receivers perform the channel estimation using a well-known scheme.

Figure 2:
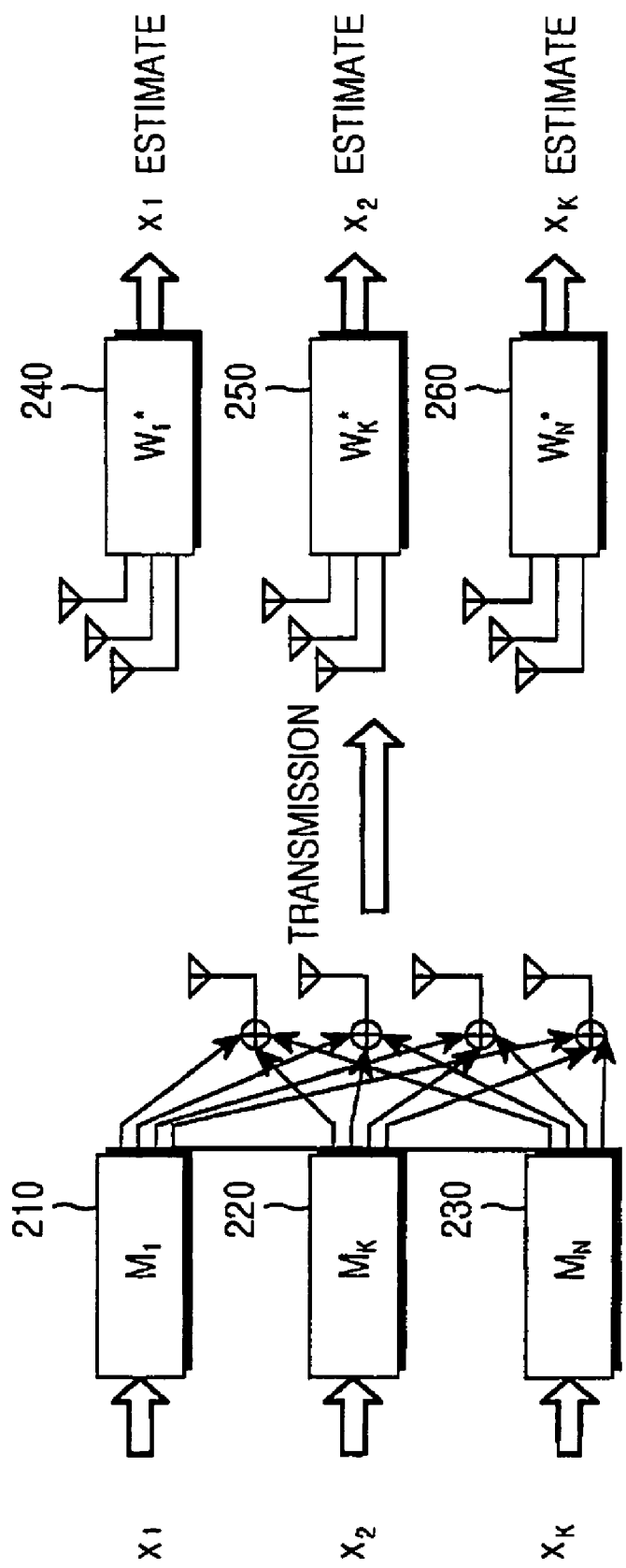
FIG. 2 is a block diagram of a typical multi-user multi-antenna communication system where a transmitter uses a plurality of TX antennas and a TX filter and a plurality of receivers each use a plurality of RX antennas and an RX filter.

Signals are transmitted from the BS to N user receivers, which is the same as the number of the TX antennas as illustrated in FIG. 2. A scheduling algorithm is used to select a user receiver. The scheduling algorithm allocates frequency, time, and space in consideration of factors such as the amount of work, delay, and Quality of Service (QoS), and uses a scheme for maximizing transmission efficiency. This scheduling algorithm may be conventional, and a scheduler for implementing the scheduling algorithm is installed preceding the SM TX filters 210, 220, . . . , 230 in FIG. 2.

After performing the scheduling algorithm, the transmitter performs the following computation phase.

Computation Phase

A simplified algorithm for computing a TX filter $M_k$ is used to reduce the complexity in the case where one layer is transmitted to each user receiver. The present invention simultaneously obtains N TX filters for N user receivers by the pseudo-inversion of effective channel matrixes. By doing this, the complex SVD operation, which needs to be performed on a digital signal process twice in each iteration phase in each user receiver, can be omitted to simplify computation.

In addition, the SVD operation necessary for initialization in each user receiver can be omitted by setting an initial RX filter to a random unitary vector.

The simplified algorithm which, reduces the complexity involved, is comprised of the following steps:

Firstly, the RX filter is initialized to a random value for each of the K users.

Secondly, the following computation is repeated $N_i$ times: Compute the effective channel matrix using the current RX filters. Then compute the pseudo-inverse of the effective channel matrix using the current RX filters and the channel matrices. Then for each user k, update the current TX filter as the normalized k-th column of the inverted effective channel matrix. Update the RX filter for each user k as the product of the channel matrix of user k by its current TX filter, followed by normalization.

The simplified algorithm which, reduces the complexity involved follows:

---

Initialization
for k = 1:K
    $W_k$ = random unitary vector of size $N_k \times 1$
end
Repeat $N_i$ times:
    Define $H_{eff} = [(W_l^* H_l)^T \ldots (W_k^* H_k)^T \ldots (W_K^* H_K)^T]^T$ for k = 1:K $$M_k = \frac{H_{eff,k}^\dagger}{\|H_{eff,k}^\dagger\|}$$

Compute $H_{eff}^\dagger = H_{eff}^* (H_{eff} H_{eff}^*)^{-1}$    $W_k = \frac{H_k M_k}{\|H_k M_k\|}$ end
End of iterations.

--- where $H_k$ represents a channel matrix of a user receiver k, $H_{eff}$ represents an effective channel matrix of a user receiver that the receiver actually experiences, $H^\dagger_{eff}$ represents a pseudo-inversion matrix of the effective channel matrix $H_{eff}$, $M_k$ is a TX filter matrix for the user receiver k, $W_k$ is an RX filter matrix for the user receiver k, T denotes transposition, and * denotes a complex conjugate transposition, $N_i$ is a iteration number.

Because the channel matrixes change with time, the present invention provides an alternate algorithm. It can be used as a process for updating the TX filters. In this algorithm, an initial value of a TX filter is set to $1_N + i1_N$ where $1_N$ is a column vector with a length of N whose every entry is 1. Although the initial value is not optimized, the performance is the same as in any initial value. Therefore, the initial value is easier to set up and the performance is the same as in the previous computation algorithm. The alternate computation algorithm is comprised of the following steps:

Firstly, the TX filter is initialized to the value $1_N + i1_N$ for each of the K users. For each user k, compute the matrix equal to the product of the transpose conjugate of the channel matrix of user k by the channel matrix of user k.

Secondly, the following computation is repeated $N_i$ times: Compute the effective channel matrix using the current TX filters and the matrices computed in the initialization step. Then compute the pseudo-inverse of the effective channel matrix. Then for each user k, update the current TX filter as the k-th column of the inverted effective channel matrix.

Thirdly, normalize the TX filter for each user k. Then for each user k, compute the RX filter as the product of the channel matrix of user k by its TX filter, followed by normalization.

The alternate computation algorithm is summarized as follows:

Initialization
for k = 1:K
$$M_k = 1_N + i1_N$$
$$\overline{H_k} = H_k^* H_k$$
end
Repeat $N_i$ times:
$$H_{\textit{eff}} = \left[ (M_1^* \overline{H_1})^T \ldots (M_k^* \overline{H_k})^T \ldots (M_K^* \overline{H_K})^T \right]^T$$
$$M = H_{\textit{eff}}^\dagger (H_{\textit{eff}} H_{\textit{eff}}^\dagger)^{-1}$$
End of iterations.
Normalize RX filters
for k = 1:K
$$M_k \leftarrow \frac{M_k}{\|M_k\|}$$
$$W_k = \frac{H_k M_k}{\|H_k M_k\|}$$
End where $H_k$ represents a channel matrix, $\overline{H}_k$ represents a modified matched channel matrix, $H_{\textit{eff}}$ represents an effective channel matrix that a user receiver actually experiences, $M_k$ is a TX filter matrix for a user receiver k, $W_k$ is an RX filter matrix for the user receiver k, T denotes transposition, and * denotes a complex conjugate transposition, $N_i$ is a iteration number.

The computation for the initialization is simple. In addition, if a channel change is sufficiently slow, the time-dependent performance can be maintained by only a few number of iterations. The above algorithm is advantageous in that not only the TX filter computation but also the RX filter computation do not require the SVD. Also, the filter computation complexity of the above algorithm is even less than that of a single-user closed-loop MIMO transmission scheme. Moreover, for all users, the RX structure of the above algorithm is simpler than that of a single-user open-loop layer transmission scheme. In addition, the transmission efficiency of the above algorithm is much higher than that of the single-user case.

Training Phase

The TX filter computed by the transmitter is transmitted to a receiver in a one-way channel sounding scheme. Instead of receiving an RX filter computed by the transmitter, the receiver receives the computed TX filter over a channel and uses the product of the received TX filter and a channel matrix as an RX filter. Therefore, the receiver does not require channel estimation for computing an RX filter. A one-way channel sounding scheme is used to transmit the TX filter to the receiver. In the one-way channel sounding scheme, a DL symbol (e.g., a pilot signal) is used to transmit to the receiver the product of the TX filter and a sequence signal (e.g., [1111]) that is agreed between the transmitter and the receiver. In another representation, the transmitter transmits the known-sequence (e.g., a pilot signal) through the TX filter of the transmitter, and the receiver receives the known-sequence which was passed thorough the TX filter and a downlink channel (the product of the TX filter and the downlink channel matrix).

As described above, a TX filter instead of an RX filter is transmitted to the user receivers. The receiver receives the TX filter over a channel and uses the product of the received TX filter and a channel matrix to decode received data.

In the present invention, a normalization process is performed using the following relationship between an RX filter and an optimal TX filter for a user receiver k.

$$W_k \sim a_k H_k M_k$$

where $a_k$ is a normalization parameter and is obtained in normalization process.

A pilot signal for the user receiver k is transmitted on a subcarrier k. At this point, a channel matrix is constant over several subcarriers. This corresponds to a case where a frequency band transmitted by a subcarrier is smaller than the coherence bandwidth of a channel. A pilot signal transmitted by a base station (BS) can be detected by beamforming a sequence (signal) that is agreed between the BS and the user receiver k. For example, the agreed sequence (signal) may be a sequence of 1's that is transmitted with a power of $P_t$. Another sequence may also be possible. A TX beamforming vector is a TX filter for the user receiver k.

That is, the pilot signal transmitted to the user receiver k on the subcarrier k is:

$$x_k = M_k \times 1 \times \sqrt{P_t} = \sqrt{P_t} M_k$$

A signal received at the user receiver k on the subcarrier is expressed as:

$$y_k = \sqrt{P_t} H_k M_k + w_k$$

where $w_k$ is an Additive White Gaussian Noise (AWGN) vector of $N_k \times 1$.

The above Equation can be rewritten as:

$$y_k = \sqrt{P_t} H_k V_{k,N} + W_k$$

Then, a received signal vector is:

$$y_k = \|H_k V_{k,N}\| \sqrt{P_t} W_k + W_k$$

The received signal is normnalized and used for estimation of an RX filter.

$$\hat{W}_k = \frac{y_k}{\|y_k\|}$$

This can be rewritten as:

$$\hat{W}_k = \frac{\|H_k V_{k,N}\|\sqrt{P_t}\, W_k + w_k}{\|\|H_k V_{k,N}\|\sqrt{P_t}\, W_k + w_k\|} = \frac{W_k + \frac{w_k}{\sqrt{P_t\|H_k V_{k,N}\|}}}{\left\| W_k + \frac{w_k}{\sqrt{P_t\|H_k V_{k,N}\|}} \right\|}$$

where $H_k$ is a channel between the transmitter and the user receiver k, $M_k$ is a TX matrix for the user receiver k, $W_k$ is an RX matrix for the user receiver k, $P_t$ is TX power, and $V_{k,n}$ is a singular vector at a null space of $H_{stacked,k}$.

When there is no noise or the power of a pilot signal increases to a high level, $\hat{W} \to W_k$.

Because of the nature of the pilot training process, user receivers do not need the estimation of their channel matrices including $NN_k$ complex coefficients. It is instead necessary to estimate each of $N_k$ (the number of RX antennas) complex coefficients. These characteristics reduce the RX complexity and increase the system bandwidth utility because the channel estimation needs a small number of pilot signals.

These pilot signals may be transmitted to user receivers as a portion of a data packet or as a preamble of a frame. The pilot signals may be transmitted over a dedicated channel or over a common channel.

This present invention can be easily applied to an Orthogonal Frequency Division Multiple Access (OFDMA) Time Division Duplexing (TDD) based multi-user MIMO channel system.

Figure 4A:
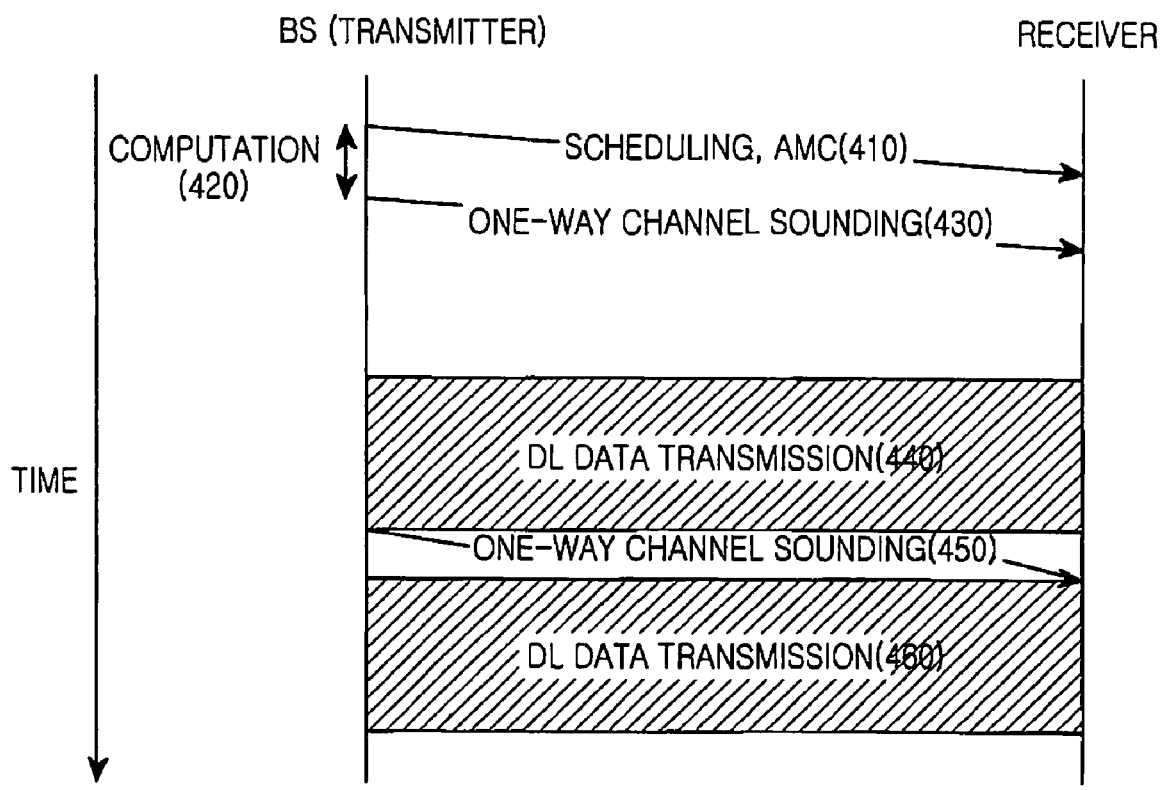
FIGS. 4A and 4B are flow diagrams illustrating a communication procedure between a transmitter and a receiver in a multi-user multi-antenna communication system according to the present invention.

Referring to FIG. 4A, a transmitter performs a scheduling operation for determining to which user receiver data will be transmitted and an Adaptive Modulation and Coding (AMC) operation, in step 410. In step 420, the transmitter computes a TX filter using the improved scheme according to the present invention. In step 430, the transmitter transmits the computed TX filter to a receiver in the one-way channel sounding scheme according to the present invention (SM TX filters 210, 220 and 230 of the transmitter compute the TX filter). Although not illustrated, receivers 240, 250, 260 and 270 use the product of the received TX filter and a channel matrix as an RX filter. The receiver normalizes the RX filter according to Equation (1) and uses the normalized RX filter. This normalization is performed in SM RX filters 240, 250 and 260 of the receivers.

$$W_k = \frac{H_k M_k}{\|H_k M_k\|} \quad (1)$$

Thereafter, a DL data transmission from the transmitter to the receiver is performed in step 440. The receiver decodes the received data using the above RX filter. After a while, the transmitter updates the TX filter and transmits the updated TX filter to the receiver in the one-way channel sounding scheme, in step 450. The receiver normalizes the product of the channel matrix and the TX filter received from the transmitter and uses the normalization value as an RX filter. Thereafter, a DL data transmission from the transmitter to the receiver is performed in step 460. The receiver decodes the received data using the normalized RX filter.

Figure 4B:
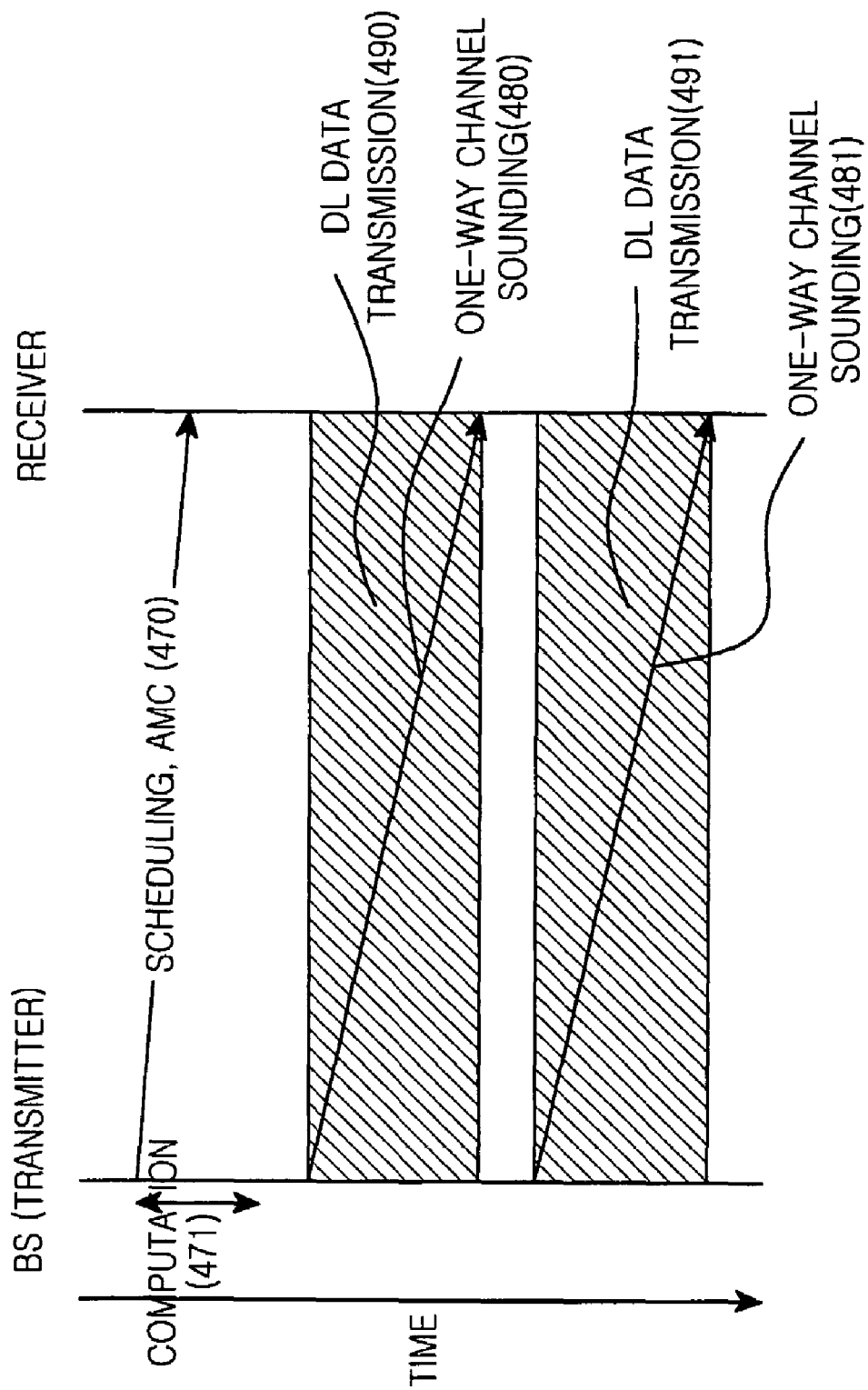

Referring to FIG. 4B, a transmitter performs a scheduling operation for determining a user receiver to which data will be transmitted and a necessary AMC operation, in step 470. In step 471, the transmitter computes a TX filter using the improved scheme according to the present invention. In step 480, the transmitter transmits the computed TX filter to a receiver in the one-way channel sounding scheme. This TX filter transmission is performed simultaneously with a DL data transmission in step 490. Receivers 240, 250, 260 and 270 use the product of the received TX filter and a channel matrix as an RX filter. The receiver normalizes the RX filter and uses the normalized RX filter. This normalization is performed in SM RX filters 240, 250 and 260 of the receivers. After a while, the transmitter updates the TX filter and transmits the updated TX filter to the receiver in the one-way channel sounding scheme, in step 481. The transmission of the updated TX filter is performed simultaneously with a next DL data transmission in step 491.

The following parameters are considered for an actual design in the OFDMA system. It is necessary to find out the number of pilot signals that can be transmitted to each user receiver and thus to find out how much reliability is available in the estimation of optimal RX vectors. A vector quantization scheme is used to detect the number of resources necessary for control signals. N user receivers are simultaneously served with respective subcarriers over sub-bands for spanning the coherence bandwidth of a channel.

The number of subcarriers: 1024

The coherence bandwidth: 256 subcarriers

The number of user receivers per coherence bandwidth=the number (N) of TX antennas=4

The coding rate of control bit: R=1/20 to 1/8

The number of control bits for vector quantization based design: B=6

The constellation used in control bits: QPSK

In order to transmit B bits to the user receivers per coherence bandwidth in a system where the control bit coding rate is R and the number of user receivers is N, it is necessary to transmit BN/R, i.e., BN/(2R) QPSK symbols. If BN/(2R) <256, an operation is possible over one OFDM symbol using BN/(2R) subcarriers per OFDM symbol. In the case of the same number of user receivers and the same coherence bandwidth, only one subcarrier is necessary that transmits a pilot signal having the same average power as a data signal for the user receivers per coherence bandwidth. Therefore, N subcarriers are necessary that operate over one OFDM symbol.

If an identical number of subcarriers are determined to be used as in the previous case, a pilot signal can be transmitted (B/(2R)=BN/(2R)/N) times. In this case, a pilot TX power is raised by B/(2R) times. When a receiver performs a Linear Minimum Mean Square Error (LMMSE) operation on a pilot signal, the average SNR of the pilot signal can be increased by $10 \log_{10}(B/2R)$ dB over the average SNR of data signals. In addition, because the pilot can be increased up to 2.5 dB, the total increase can be up to about $(2.5 + 10 \log_{10}(B/2R))$ dB. For the foregoing parameters, an efficient pilot voltage increases by 16.3 dB to 20.3 dB for 1/8 to 1/20 coding rates.

Data Transmission Phase

A BS transmitter transmits the product of a TX filter and a vector of modulation symbols s (where $S_k$ is a symbol transmitted to a user receiver k). Theses symbols are transmitted over a channel under the total TX power $P_0$.

The total TX power is equally allocated to N layers (from N TX antennas to the respective user receivers).

A transmitted vector is represented by:

$$x = \sqrt{\frac{P_0}{N}} \sum_{n=1}^{N} M_n s_n$$

A signal received by the user receiver k is represented by:

$$y_k = \sqrt{\frac{P_0}{N}} H_k \sum_{n=1}^{N} M_n s_n + w_k$$

The user receiver k multiplies the received signal by its RX filter to obtain $$\hat{s}_k = \hat{W}_k^* y_k,$$

$$\hat{s}_k = \hat{W}_k^* \left( \sqrt{\frac{P_0}{N}} H_k \sum_{n=1}^{N} M_n s_n + w_n \right),$$

$$\hat{s}_k = \sqrt{\frac{P_0}{N}} \sum_{n=1}^{N} \hat{W}_k^* H_k M_n s_n + W_k^* w_n.$$

Theoretically, if $$\hat{W}_k = W_k, \hat{W}_k H_k M_n = \begin{cases} 0, k \neq n \\ 1, k = n \end{cases}.$$

Therefore, $$\hat{s}_k = \sqrt{\frac{P_0}{N}} s_k + w_k$$

in theory.

where $H_k$ is a channel between the transmitter and the user receiver k, $M_n$ is a TX matrix for a user receiver n, $W_k$ is an RX matrix for the user receiver k, $P_0$ is the total TX power, and $w_k$ and $w_n$ are AWGNs.

On the assumption that user receivers can perfectly estimate RX filters, the BS can adapt the power allocated to each layer by using a conventional water filling scheme instead of a uniform power allocation scheme, thereby increasing the transmission efficiency.

Figure 5A:
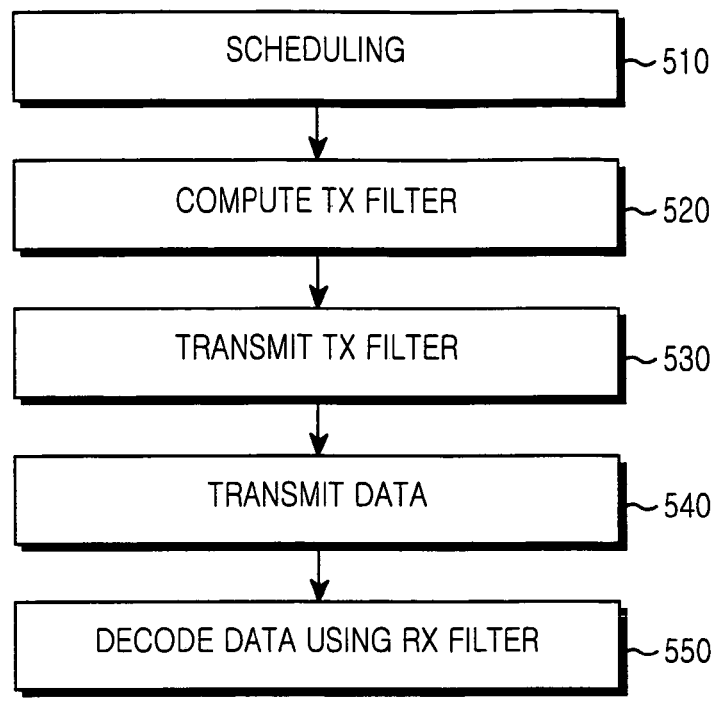
FIGS. 5A and 5B are flowcharts illustrating a transmission procedure in a multi-user multi-antenna communication system using an algorithm according to the present invention.

Referring to FIG. 5A, a transmitter performs a scheduling operation for determining to which user receiver it will transmit data, in step 510. An Adaptive Modulation and Coding (AMC) operation may also be performed in step 510. In step 520, the transmitter computes a TX filter using the improved scheme according to the present invention. In step 530, the transmitter transmits the computed TX filter to a receiver using the one-way channel sounding scheme according to the present invention. In step 540, the transmitter transmits data to the receiver.

The receiver multiplies the received TX filter by a channel matrix to obtain an RX filter, and normalizes the RX filter using Equation (1):

$$W_k = \frac{H_k M_k}{\|H_k M_k\|} \quad (1)$$

In step 550, the receiver decodes the received data using the normalized RX filter.

Figure 5B:
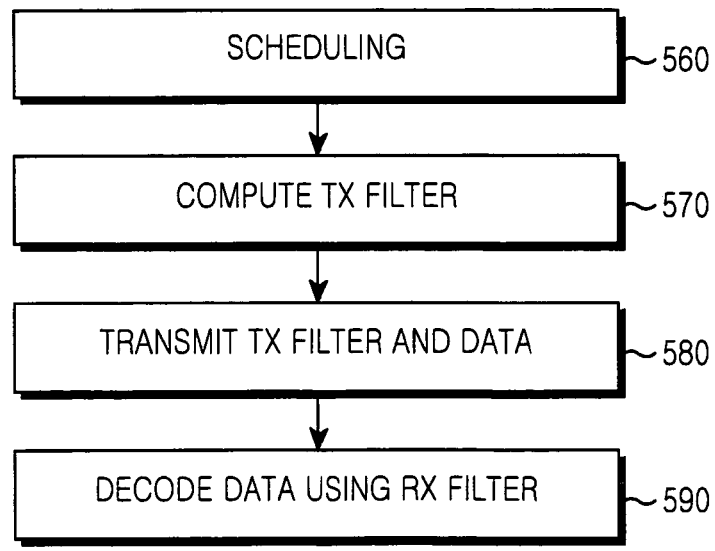

Referring to FIG. 5B, a transmitter performs a scheduling operation for determining to which user receiver it will transmit data, in step 560. An AMC operation may also be performed in step 560. In step 570, the transmitter computes a TX filter using the improved scheme according to the present invention. In step 580, the transmitter transmits the computed TX filter and data to a receiver using the one-way channel sounding scheme according to the present invention.

In step 590, the receiver multiplies the received TX filter by a channel matrix to obtain an RX filter, normalizes the RX filter, and decodes the received data using the normalized RX filter.

Simulation Results

The performance of the present invention will now be examined in terms of the spectral efficiency using the Monte-Carlo simulation model.

Figure 3:
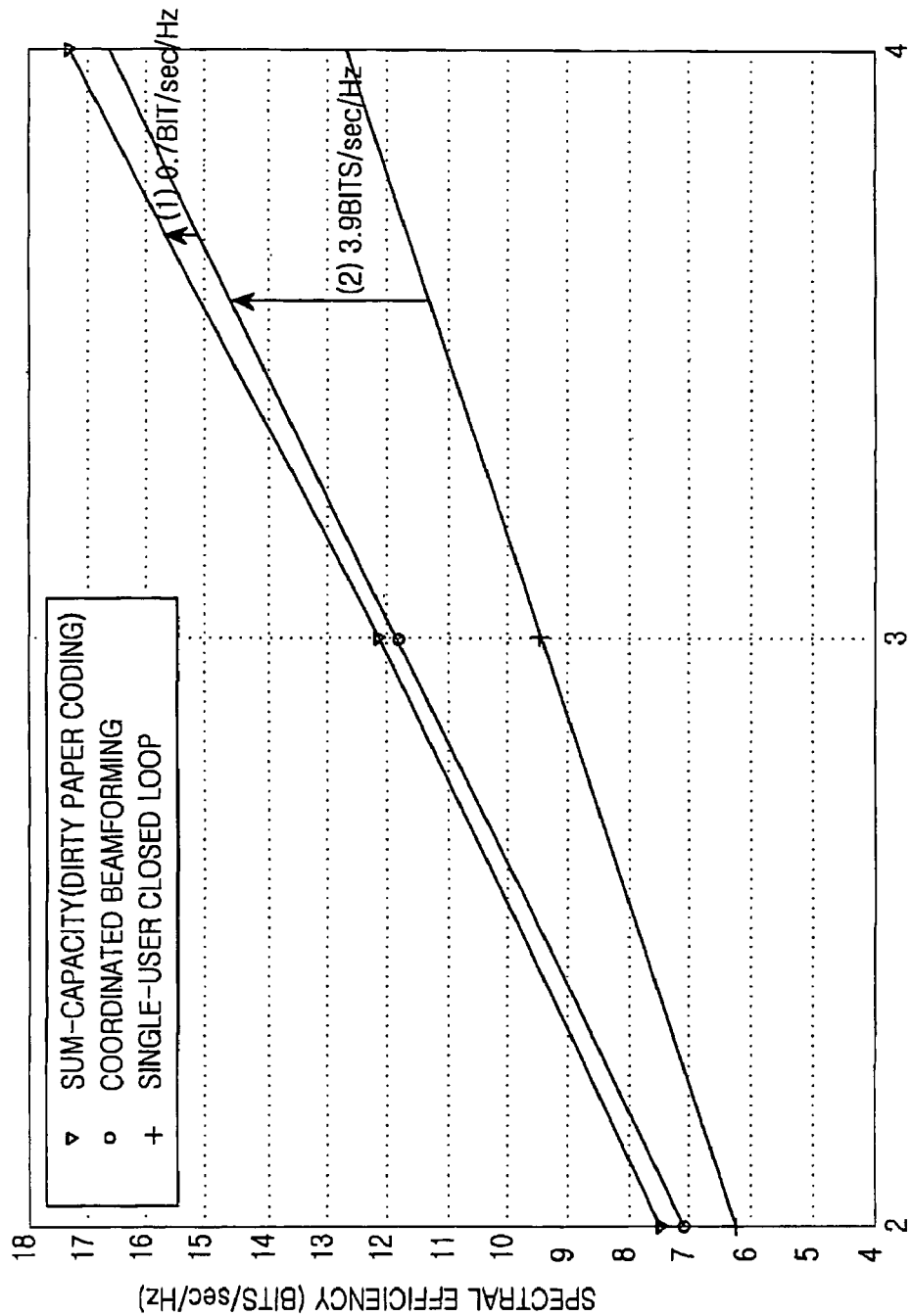
FIG. 3 is a graph illustrating spectral efficiencies depending on the type of algorithm used in a multi-user multi-antenna communication system.
Figure 6:
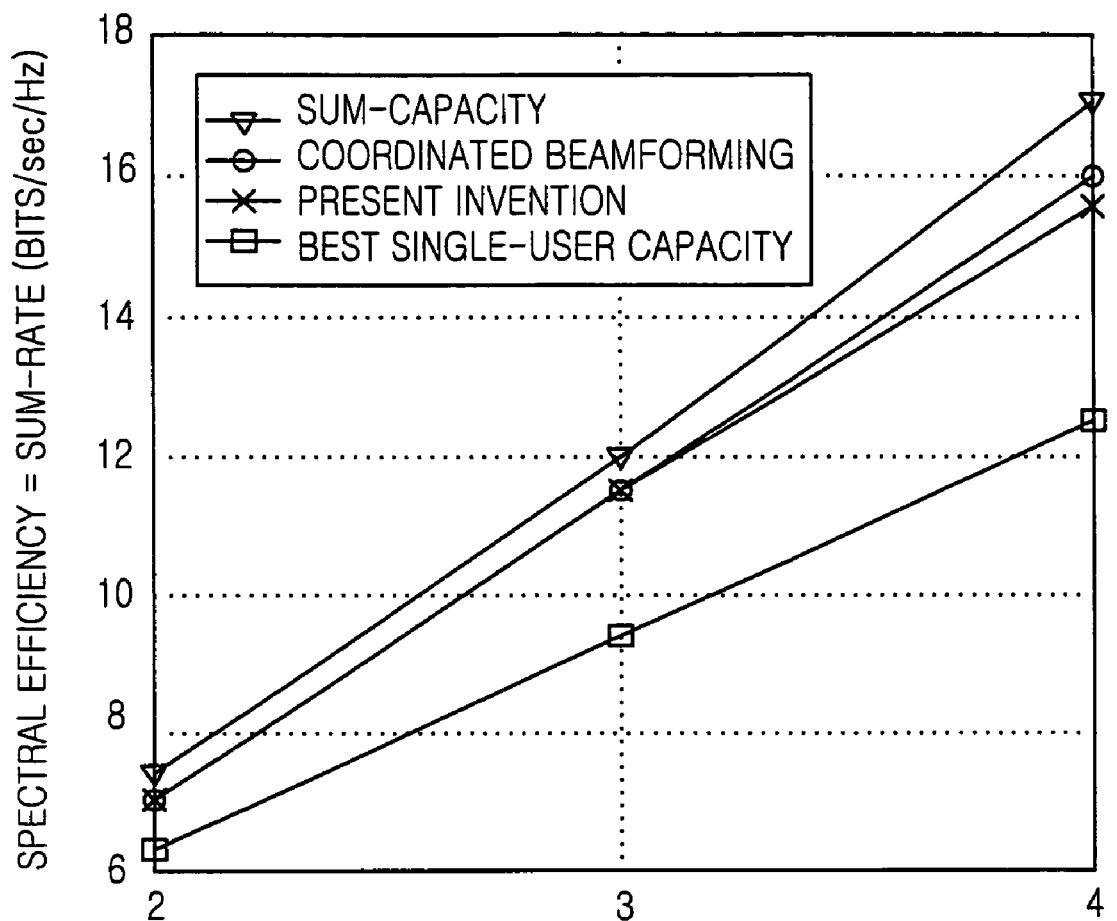
FIG. 6 is a graph illustrating spectral efficiencies depending on the number of TX antennas in a multi-user multi-antenna communication system using an algorithm according to the present invention.

FIG. 6 is a graph illustrating spectral efficiencies depending on the number of TX antennas in a multi-user multi-antenna communication system using the algorithm according to the present invention. The conditions in FIG. 6 are identical to those in FIG. 3. The algorithm according to the present invention can be implemented in an actual system. A dirty paper coding algorithm is the theoretically best case, and a coordinated beamforming algorithm is an unrealistic case. As can be seen from FIG. 6, the algorithm according to the present invention is very similar in performance to the dirty paper coding algorithm and the coordinated beamforming algorithm.

Figure 7:
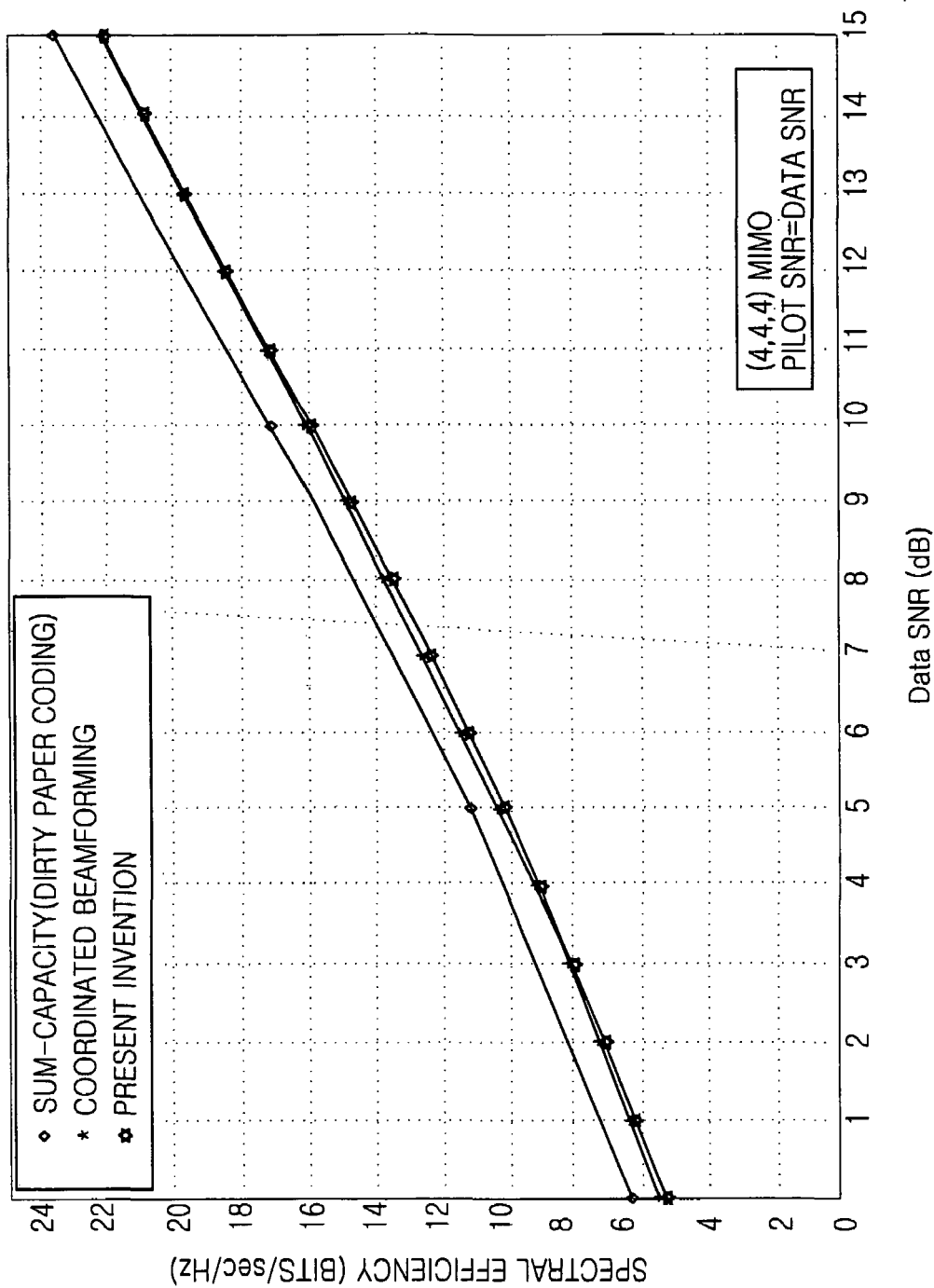
FIG. 7 is a graph illustrating spectral efficiencies depending on data SNRs in a multi-user multi-antenna communication system using an algorithm according to the present invention.

FIG. 7 is a graph illustrating spectral efficiencies depending on data SNRs in a multi-user multi-antenna communication system using an algorithm according to the present invention. FIG. 7 illustrates a case where a transmitter has four TX antennas and four receivers each have four RX antennas. As can also be seen from FIG. 7, the algorithm according to the present invention is very similar in performance to the dirty paper coding algorithm and the coordinated beamforming algorithm.

As described above, the present invention provides a data transmitting apparatus and method for computing a TX filter of a transmitter in the improved scheme and transmitting the computed TX filter to a receiver in the one-way channel sounding scheme and a data receiving apparatus and method for receiving the TX filter over a channel and using the product of the received TX filter and a channel matrix as an RX filter. Accordingly, it is possible to reduce the system complexity. In addition, the receiver can be reduced in complexity because it does not require the channel estimation.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A transmitter for a multi-user multi-antenna communication system, the transmitter comprising:

a Spatial Multiplexing (SM) transmit (TX) filter unit for computing TX filters for a plurality of user receivers, wherein each TX filter is computed in accordance with a pseudo-inversion of a respective effective channel matrix using a corresponding receive (RX) filter initially set to a random unitary vector; and a plurality of antennas for transmitting the computed TX filters to the corresponding user receivers.

2. The transmitter of claim 1, wherein an N number of the TX filters are computed for an N number of the user receivers.

3. The transmitter of claim 1, wherein the SM TX filter unit further computes RX.

4. The transmitter of claim 1, wherein the transmitter determines a data transmission schedule for the user receivers and provides the determined data transmission schedule to the SM TX filter unit.

5. The transmitter of claim 1, wherein the channel matrixes are estimated using uplink sounding pilots from the user receivers.

6. The transmitter of claim 1, wherein the channel matrixes are reported by the user receivers.

7. The transmitter of claim 1, wherein the TX filters are computed using the following algorithm:

---

Initialization
    for k = 1:K
        $W_k$ = random unitary vector of size $N_k \times 1$
    end
Repeat $N_i$ times:
    Define $.H_{eff} = [(W_1^* H_1)^T \ldots (W_k^* H_k)^T \ldots (W_K^* H_K)^T]^T$ Compute $.H_{eff}^\dagger = H_{eff}^* (H_{eff} H_{eff}^*)^{-1}$
    for k = 1:K $$M_k = \frac{H_{eff,k}^\dagger}{\|H_{eff,k}^\dagger\|}$$

$$W_k = \frac{H_k M_k}{\|H_k M_k\|}$$

end
End of iterations

--- where $H_{eff}$ represents an effective channel matrix of a user receiver that the receiver experiences, $H^\dagger_{eff}$ represents a pseudo-inversion matrix of the effective channel matrix $H_{eff}$, $M_k$ is a TX filter matrix for a user receiver k, $W_k$ is an RX filter matrix for the user receiver k, T denotes transposition, and * denotes a complex conjugate transposition.

8. A transmitter for a multi-user multi-antenna communication system, comprising:

a Spatial Multiplexing (SM) transmit (TX) filter unit for computing a TX filter for each user receiver, wherein each TX filter is computed in accordance with a pseudo-inversion of a respective effective channel matrix using a corresponding receive (RX) filter initially set to a random unitary vector; and a plurality of antennas for transmitting a training sequence to each user receiver which are applied by the computed TX filter.

9. The transmitter of claim 8, wherein an N number of the TX filters are computed for an N number of the user receivers.

10. The transmitter of claim 8, wherein the transmitter computes RX filters as well as the TX filters.

11. The transmitter of claim 8, wherein the transmitter determines a data transmission schedule for the user receivers, and provides the determined data transmission schedule to the SM TX filter unit.

12. The transmitter of claim 8, wherein the TX filters are computed using the following algorithm:

---

Initialization
    for k = 1:K
        $W_k$ = random unitary vector of size $N_k \times 1$
    end
Repeat $N_i$ times:
    Define $.H_{eff} = [(W_1^* H_1)^T \ldots (W_k^* H_k)^T \ldots (W_K^* H_K)^T]^T$ Compute $.H_{eff}^\dagger = H_{eff}^* (H_{eff} H_{eff}^*)^{-1}$
    for k = 1:K $$M_k = \frac{H_{eff,k}^\dagger}{\|H_{eff,k}^\dagger\|}$$

$$W_k = \frac{H_k M_k}{\|H_k M_k\|}$$

end
End of iterations

--- where $H_{eff}$ represents an effective channel matrix of a user receiver that the receiver experiences, $H^\dagger_{eff}$ represents a pseudo-inversion matrix of the effective channel matrix $H_{eff}$, $M_k$ is a TX filter matrix for a user receiver k, $W_k$ is an RX filter matrix for the user receiver k, T denotes transposition, and * denotes a complex conjugate transposition.

13. A method for transmitting data from a transmitter in a multi-user multi-antenna communication system, the method comprising the steps of:

computing transmit (TX) filters for a plurality of user receivers, wherein each TX filter is computed in accordance with a pseudo-inversion of a respective effective channel matrix using a corresponding receive (RX) filter initially set to a random unitary vector;

transmitting the computed TX filters through a plurality of antennas to the corresponding user receivers in a one-way channel sounding scheme; and transmitting data to the user receivers.

14. The method of claim 13, wherein an N number of the TX filters are computed for an N number of the user receivers.

15. The method of claim 13, wherein RX filters are computed simultaneously with the computation of the TX filters.

16. The method of claim 13, further comprising determining a data transmission schedule for the user receivers and providing the determined data transmission schedule to a Spatial Multiplexing (SM) TX filter unit of the transmitter.

17. The method of claim 13, wherein channel matrixes are estimated using uplink sounding pilots from the user receivers.

18. The method of claim 13, wherein channel matrixes are reported by the user receivers.

19. The method of claim 13, wherein the TX filters are computed using the following algorithm:

---

Initialization
    for k = 1:K
        $W_k$ = random unitary vector of size $N_k \times 1$
    end
Repeat $N_i$ times:
    Define $.H_{eff} = [(W_1^* H_1)^T \ldots (W_k^* H_k)^T \ldots (W_K^* H_K)^T]^T$ -continued $$\text{Compute } .H_{\textit{eff}}^\dagger = H_{\textit{eff}}^\dagger (H_{\textit{eff}} H_{\textit{eff}}^\dagger)^{-1}$$
for k = 1:K $$M_k = \frac{H_{\textit{eff},k}^\dagger}{\|H_{\textit{eff},k}^\dagger\|}$$

$$W_k = \frac{H_k M_k}{\|H_k M_k\|}$$

end
End of iterations where $H_{\textit{eff}}$ represents an effective channel matrix of a user receiver that the receiver experiences, $H^\dagger_{\textit{eff}}$ represents a pseudo-inversion matrix of the effective channel matrix $H_{\textit{eff}}$, $M_k$ is a TX filter matrix for a user receiver k, $W_k$ is an RX filter matrix for the user receiver k, T denotes transposition, and * denotes a complex conjugate transposition.

20. A method for transmitting data from a transmitter in a multi-user multi-antenna communication system, the method comprising the steps of:
   computing transmit (TX) filters for a plurality of user receivers, wherein each TX filter is computed in accordance with a pseudo-inversion of a respective effective channel matrix using a corresponding receive RX filter initially set to a random unitary vector; and
   transmitting a training sequence through a plurality of antennas which are applied by the computed TX filters to the corresponding user receivers.

21. The method of claim 20, wherein an N number of the TX filters are computed for an N number of the user receivers.

22. The method of claim 20, wherein RX filters are computed with the computation of the TX filters.

23. The method of claim 20, further comprising determining a data transmission schedule for the user receivers and providing the determined data transmission schedule to a Spatial Multiplexing (SM) TX filter unit of the transmitter.

24. The method of claim 20, wherein the TX filters are computed using the following algorithm:

Initialization
for k = 1:K
    $W_k$ = random unitary vector of size $N_k \times 1$
end
Repeat $N_i$ times:
    Define $.H_{\textit{eff}} = [(W_l^* H_l)^T \ldots (W_k^* H_k)^T \ldots (W_K^* H_K)^T]^T$ $$\text{Compute } .H_{\textit{eff}}^\dagger = H_{\textit{eff}}^\dagger (H_{\textit{eff}} H_{\textit{eff}}^\dagger)^{-1}$$
for k = 1:K $$M_k = \frac{H_{\textit{eff},k}^\dagger}{\|H_{\textit{eff},k}^\dagger\|}$$

$$W_k = \frac{H_k M_k}{\|H_k M_k\|}$$

end
End of iterations where $H_{\textit{eff}}$ represents an effective channel matrix of a user receiver that the receiver experiences, $H^\dagger_{\textit{eff}}$ represents a pseudo-inversion matrix of the effective channel matrix $H_{\textit{eff}}$, $M_k$ is a TX filter matrix for a user receiver k, $W_k$ is an RX filter matrix for the user receiver k, T denotes transposition, and * denotes a complex conjugate transposition.

* * * * *